(12) United States Patent
Tanabe

(10) Patent No.: US 12,549,552 B2
(45) Date of Patent: Feb. 10, 2026

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Toshihiko Tanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 570 days.

(21) Appl. No.: 17/894,129

(22) Filed: Aug. 23, 2022

(65) Prior Publication Data

US 2023/0319045 A1    Oct. 5, 2023

(30) Foreign Application Priority Data

Mar. 29, 2022    (JP) .................................. 2022-054503

(51) Int. Cl.
*H04L 9/40*    (2022.01)

(52) U.S. Cl.
CPC .......... *H04L 63/101* (2013.01); *H04L 63/104* (2013.01)

(58) Field of Classification Search
CPC ............................ H04L 63/101; H04L 63/104
See application file for complete search history.

(56) References Cited

U.S. PATENT DOCUMENTS

| | | | | |
|---|---|---|---|---|
| 2004/0254934 A1* | 12/2004 | Ho | ......................... | H04L 63/105 707/999.009 |
| 2011/0023102 A1* | 1/2011 | Ikeda | ..................... | G06F 21/608 726/7 |
| 2020/0036697 A1* | 1/2020 | Minami | .............. | H04L 63/0876 |
| 2020/0356692 A1* | 11/2020 | Copsey | ............... | H04W 12/084 |
| 2023/0055726 A1* | 2/2023 | Bandyopadhyay | ..... | H04L 63/20 |
| 2023/0168847 A1* | 6/2023 | Yano | ...................... | G06F 3/1205 358/1.15 |
| 2023/0179717 A1* | 6/2023 | Mihira | ............... | H04N 1/00411 358/1.15 |

FOREIGN PATENT DOCUMENTS

| | | | |
|---|---|---|---|
| JP | 2007336077 | | 12/2007 |
| JP | 2007336077 A | * | 12/2007 |

* cited by examiner

*Primary Examiner* — Yonas A Bayou
(74) *Attorney, Agent, or Firm* — JCIPRNET

(57) ABSTRACT

An information processing apparatus includes a processor configured to: receive registration of a procedure of a process in a computer system, the procedure including a step requiring an authority of a predetermined authorized person; receive a request to execute the procedure from a user of the computer system; request the authorized person to execute an operation for executing the step requiring the authority, in response to the reception of the request; and receive the operation by the authorized person to execute the procedure including the step requiring the authority.

13 Claims, 12 Drawing Sheets

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-054503 filed Mar. 29, 2022.

BACKGROUND

(i) Technical Field

The present invention relates to an information processing apparatus, an information processing system, and a non-transitory computer readable medium storing a program.

(ii) Related Art

JP2007-336077A describes an image forming apparatus in which the administrator can easily know the setting status of setting items, and in a case where setting information stored in a storage unit has been changed, an e-mail notifying the change with a predetermined user as the notification destination is sent.

In the operation of various computer systems, an authorized person such as a so-called systems administrator (SA) is designated, and the authority to access some information and functions is given only to the account of the authorized person. The authorized person can perform work related to computer system management such as adding or changing a new account or changing network settings by the given authority.

SUMMARY

In such a computer system, a user, including an unauthorized person, may expect a process requiring authority. In this case, the process is executed by the authorized person who has received the request from the user performing the work with the authority.

Here, in a case where the user does not know the required authority, or in a case where the user does not know the authorized person who has the authority, the user cannot request the correct authorized person, and the procedure from the request to the execution of the process may not be performed smoothly. This problem is particularly noticeable in a case where a plurality of authorized persons are given different authorities, respectively.

Aspects of non-limiting embodiments of the present disclosure relate to an information processing apparatus, an information processing system, and a non-transitory computer readable medium storing a program that facilitate the procedure from the request to the execution of the process, as compared with the case where the user makes a request directly to the authorized person.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: receive registration of a procedure of a process in a computer system, the procedure including a step requiring an authority of a predetermined authorized person; receive a request to execute the procedure from a user of the computer system; request the authorized person to execute an operation for executing the step requiring the authority, in response to the reception of the request; and receive the operation by the authorized person to execute the procedure including the step requiring the authority.

BRIEF DESCRIPTION OF THE DRAWINGS

Exemplary embodiment(s) of the present invention will be described in detail based on the following figures, wherein:

FIG. 6A is a screen displayed in a case where a "flow creation/editing" button is pressed, and FIG. 6B is a registration screen displayed in a case where an "edit/delete" button is pressed;

FIGS. 7A to 7D are diagrams showing an example of screen transitions in a case of adding a step to a procedure, in which FIG. 7A is a screen including a list of step groups classified according to the relationship between steps, FIG. 7B is a screen including a list of further finely classified step groups, FIG. 7C is a screen including a list of steps included in the selected step group, and FIG. 7D is a screen asking whether or not to add the selected step;

FIGS. 9A and 9B are diagrams showing an example of a screen relating to a request, in which FIG. 9A is a request screen for receiving a request for execution of a procedure, and FIG. 9B is a screen including information indicating that a request notification has been transmitted;

DETAILED DESCRIPTION

Hereinafter, an exemplary embodiment of the present invention (hereinafter referred to as "the present exemplary embodiment") will be described in detail with reference to the accompanying drawings.

In the following description, "computer system" refers to a system that includes one or a plurality of computers and provides some information or function to a registered user. In such a computer system, an access to some information or functions may require the authority of a predetermined authorized person. The "authorized person" is a person who has (given) a predetermined authority, among computer system users, and is distinguished from users who does not have the authority (sometimes referred to as an "unauthorized person").

Computer System 1000

Figure 1:
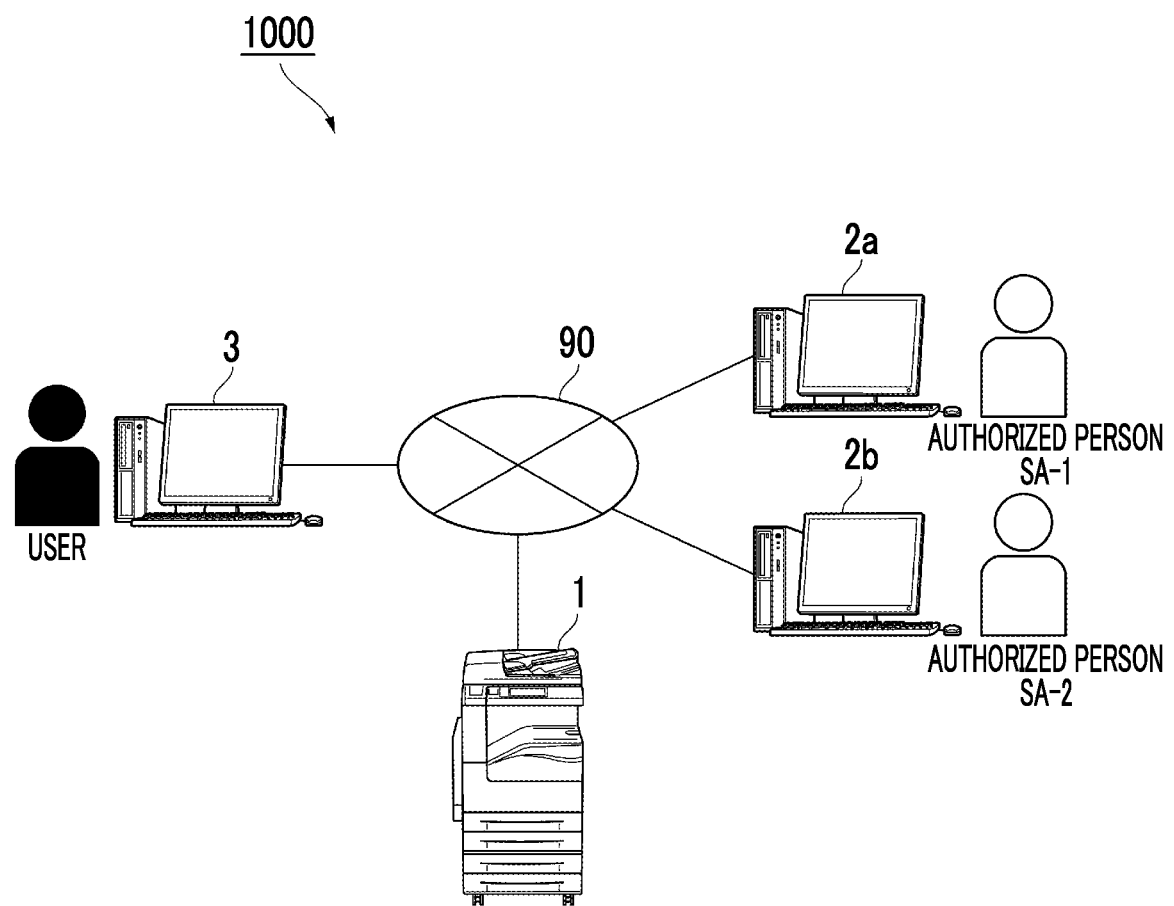
FIG. 1 is a diagram showing an example of the configuration of a computer system according to the present exemplary embodiment.

FIG. 1 is a diagram showing an example of the configuration of a computer system 1000 according to the present exemplary embodiment. As shown in FIG. 1, the computer system 1000 includes an image forming apparatus 1, authorized person terminals 2 (2a, 2b), and a user terminal 3 which are connected via a network 90.

The network 90 is not particularly limited as long as the network 90 can be used for data communication between apparatuses in the computer system 1000. The network 90 may be implemented by, for example, a local area network (LAN), a wide area network (WAN), the Internet, or the like. Further, wired or wireless networks may be used together regardless of whether the networks are wired or wireless. Further, a relay device such as a gateway device, a router, or an access point may be used to connect each device via a plurality of networks or communication lines.

The image forming apparatus 1 is a so-called multifunction apparatus that implements various image processing functions such as a printing function, an image reading (scanning) function, a copying function, and a facsimile function, based on the instruction from a user.

In the present exemplary embodiment, the image forming apparatus 1 is shared among users registered in the computer system 1000, and receives instructions and operations from the users in providing the various image processing functions described above.

Further, the image forming apparatus 1 to which the present exemplary embodiment is applied has a system management function for changing various setting items in the computer system 1000 as one of the functions related to the management of the computer system 1000. The setting items include, for example, "new user registration" for registering (adding) a new user to the computer system 1000, "IP address change" for changing the internet protocol (IP) address for identifying the image forming apparatus 1, "system clock setting" for setting the time used in the computer system 1000, or the like.

Here, changing setting items by the system management function requires one or a plurality of works. The image forming apparatus 1 receives registration of a procedure including steps corresponding to a necessary work, as a "procedure" for executing a process related to changing setting items. More specifically, the procedure is registered such that the progress of the steps in the procedure and the flow of work related to changing setting items correspond to each other. Thus, the process related to changing setting items is completed, in response to the completion of the procedure. In addition, "procedure" may be described as "flow".

To change the setting items, a predetermined authority is requested, and work by an authorized person having the requested authority is required. More specifically, some operation by an authorized person is required. The image forming apparatus 1 receives registration of a procedure, with a step corresponding to work by an authorized person as a "step requiring an authority". Correspondingly, the operation required by the authorized person is the operation for executing the step requiring the authority. The number of requested authorities is not limited to one, and a plurality of authorities may be requested depending on the setting items. Therefore, the procedure to be registered may include a plurality of steps requiring authorities.

The authorized person terminal 2 is an apparatus used by the authorized person SA (SA-1, SA-2), and is a computer that performs data communication with the image forming apparatus 1 via the network 90. The authorized person terminal 2 according to the present exemplary embodiment displays, for example, the information received from the image forming apparatus 1 on a display unit such as a liquid crystal display. The authorized person SA can know the information displayed on the authorized person terminal 2 as a notification from the image forming apparatus 1.

As the authorized person terminal 2, for example, a personal computer (PC), a tablet terminal, or a smartphone can be used.

Further, the user terminal 3 is an apparatus used by the user, and is a computer that performs data communication with the image forming apparatus 1 via the network 90. For example, the user terminal 3 according to the present exemplary embodiment transmits an instruction relating to the use of the image processing function to the image forming apparatus 1, according to the received operation of the user. Further, for example, the information received from the image forming apparatus 1 is displayed on a display unit such as a liquid crystal display. The user can know the information displayed on the user terminal 3 as a notification from the image forming apparatus 1.

As the user terminal 3, a PC, a tablet terminal, or a smartphone can be used as in the authorized person terminal 2.

The computer system 1000 may include various computers in addition to the image forming apparatus 1, the authorized person terminal 2, and the user terminal 3 shown in FIG. 1. For example, a server apparatus or the like that stores and manages data exchanged between the image forming apparatus 1, the authorized person terminal 2, and the user terminal 3 via the network 90 may be included.

Further, in the example of FIG. 1, two authorized person terminals 2a and 2b and one user terminal 3 are shown, but the number of authorized person terminals 2 and user terminals 3 is not limited. For example, the number may be different depending on the number of users and the number of authorized persons in the computer system 1000.

Hardware Configuration of Image Forming Apparatus 1

Figure 2:
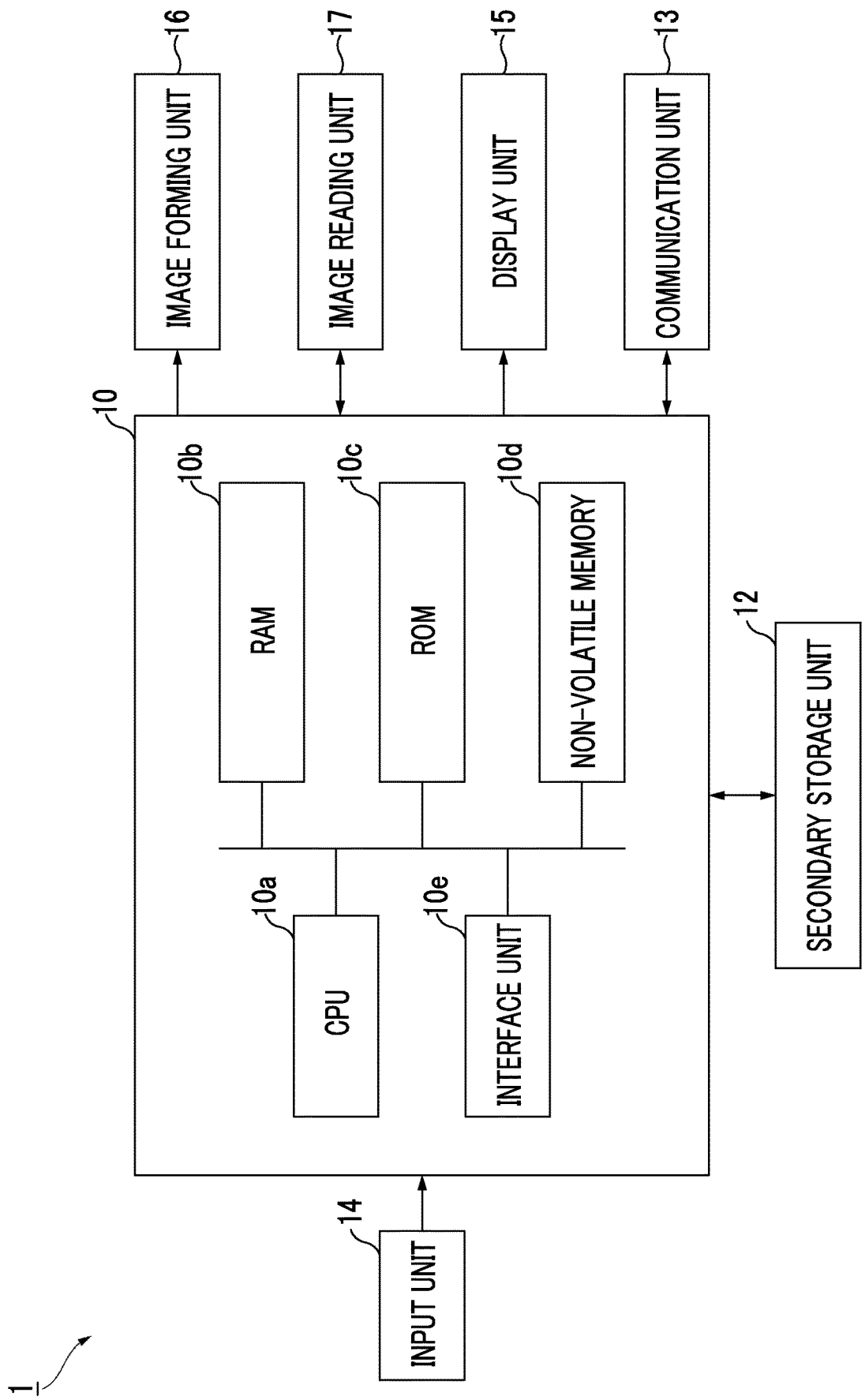
FIG. 2 is a block diagram showing an example of the hardware configuration of an image forming apparatus according to the present exemplary embodiment.

FIG. 2 is a block diagram showing an example of the hardware configuration of the image forming apparatus 1 according to the present exemplary embodiment.

The image forming apparatus 1 which is an example of the information processing apparatus includes an arithmetic processing unit 10, a secondary storage unit 12, a communication unit 13, an input unit 14, and a display unit 15. Further, the image forming apparatus 1 includes an image forming unit 16 and an image reading unit 17 as functional units for implementing an image processing function.

The arithmetic processing unit 10 performs an arithmetic operation according to the read program, executes various processes in the image forming apparatus 1, and controls the host apparatus. Further, the arithmetic processing unit 10 includes a central processing unit (CPU) 10a as an arithmetic unit, a random access memory (RAM) 10b used as a working memory of the CPU 10a, and a read only memory (ROM) 10c in which a program executed by the CPU 10a, setting values prepared in advance, or the like are stored.

Further, the arithmetic processing unit 10 includes a non-volatile memory 10*d* that is rewritable and capable of holding data even in a case where the power supply is interrupted, and an interface unit 10*e* that controls each unit such as an input unit 14 connected to the arithmetic processing unit 10. The non-volatile memory 10*d* includes, for example, an SRAM or a flash memory backed up by a battery.

The secondary storage unit 12 records a program to be executed by the CPU 10*a*, and also stores various data such as image data used by the image forming unit 16 and image data read by the image reading unit 17. Further, the secondary storage unit 12 according to the present exemplary embodiment stores information related to setting items managed by the system management function, information on the users registered in the computer system 1000, information on the authority given to the authorized person, the procedure (described later) used in the system management function, or the like.

The secondary storage unit 12 is implemented by, for example, a storage device such as a magnetic disk device or a solid state drive (SSD).

The communication unit 13 performs data communication with another apparatus via the network 90. As the communication unit 13, an interface corresponding to the communication method of the network 90 is used.

The input unit 14 is a device such as a hardware button or switch that receives an input operation from a user, a touch sensor that outputs a control signal corresponding to an operation touched by a finger, a code reader that reads code information such as a bar code or a QR code (registered trademark), a card reader that reads an integrated circuit (IC) card such as an employee ID card, and a sensor that reads a user's biometric information.

The display unit 15 displays a screen including various images and text information. The display unit 15 is, for example, a liquid crystal display. Further, the touch sensor as one of the input units 14 and the display unit 15 may be combined to form a touch panel.

The image forming unit 16 is, for example, a printer engine of a laser printer or an inkjet printer, and forms and outputs image data on a recording material such as paper, in response to an instruction from the arithmetic processing unit 10. The image data to be formed is acquired from another apparatus such as the user terminal 3 via the network 90, and stored in the secondary storage unit 12. Further, for example, the result of reading (described later) by the image reading unit 17 is used.

The image reading unit 17 is an image scanner or the like, and reads the image formed on the recording material such as paper, in response to an instruction from the arithmetic processing unit 10, and outputs the image as image data. The output image data is used, for example, for image formation by the image forming unit 16. Further, for example, the image data is transmitted to another apparatus such as the user terminal 3 via the network 90.

In the image forming apparatus 1 to which the present exemplary embodiment is applied, various functions in the image forming apparatus 1 can be used by the CPU 10*a*, which is an example of the processor, reading and executing the program. For example, in a case where the CPU 10*a* reads the management program, various system management functions can be used. Further, for example, in a case where the CPU 10*a* reads the image processing program, various image processing functions can be used.

Here, various programs to be executed by the CPU 10*a* is provided by being stored in a computer readable recording medium such as a magnetic recording medium (a magnetic tape, a magnetic disk, or the like), an optical recording medium (optical disk, or the like), an optical magnetic recording medium, or a semiconductor memory. Further, the program executed by the CPU 10*a* may be downloaded by using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Functional Configuration of Image Forming Apparatus 1

Next, the functional configuration of the image forming apparatus 1 will be described with reference to FIG. 3. Here, the functional configuration related to the system management function will be described.

Figure 3:
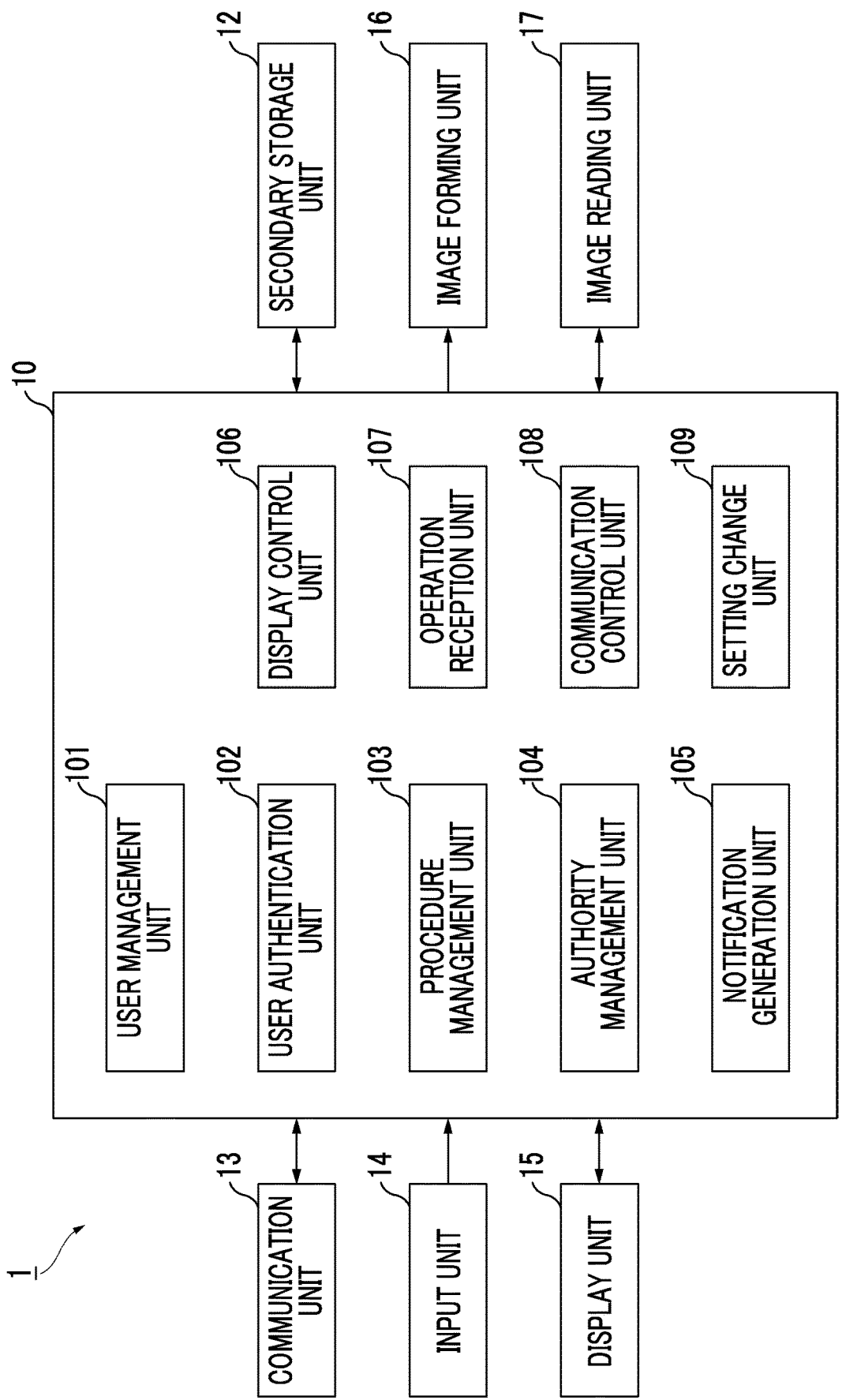
FIG. 3 is a block diagram showing an example of the functional configuration of the image forming apparatus according to the present exemplary embodiment.

FIG. 3 is a block diagram showing an example of the functional configuration of the image forming apparatus 1 according to the present exemplary embodiment. The image forming apparatus 1 includes a user management unit 101, a user authentication unit 102, a procedure management unit 103, an authority management unit 104, a notification creation unit 105, a display control unit 106, an operation reception unit 107, a communication control unit 108, and a setting change unit 109, which are implemented by the arithmetic processing unit 10 shown in FIG. 2.

The user management unit 101 manages the information on the users registered in the computer system 1000 for each user. The information on users to be managed includes, for example, a user ID for identifying each user, a set password, a user name, identification information of a user terminal 3, and usage restriction information that restricts available image processing functions. These pieces of information are input and managed, for example, in a case where a new user is registered in the computer system 1000, or in a case where a change is made with respect to an already registered user.

The user authentication unit 102 authenticates the person operating the image forming apparatus 1 as a user, based on the information input via the input unit 14. More specifically, in a case where the input information such as the user ID and password matches the information on any user managed by the user management unit 101, the user is authenticated as the corresponding user. Further, in a case where the input information such as the user ID and password matches the information on the authorized person managed by the authority management unit 104, the user authentication unit 102 authenticates the user as an authorized person.

Although the case where the image forming apparatus 1 authenticates the user has been described, for example, the user may be authenticated by requesting authentication from an apparatus such as an external authentication server and receiving the authentication result.

The procedure management unit 103 registers and manages the procedure used in the system management function. More specifically, the registration of the procedure is received and stored in the secondary storage unit 12, and the related information such as the name, the registration date, and the registrant of the procedure is managed in association with the procedure. The procedure management unit 103 according to the present exemplary embodiment is an example of a registration unit that receives the registration of the procedure.

Further, the procedure management unit 103 takes out the procedure selected by the user from the secondary storage unit 12, and receives a request for execution. The procedure management unit 103 according to the present exemplary embodiment is an example of a request unit that receives registration of a procedure.

In the present exemplary embodiment, the procedure management unit 103 receives the registration of the procedure by the authorized person. More specifically, in the image forming apparatus 1, in a case where the person performing the operation for registering the procedure is authenticated as an authorized person, the registration of the procedure is received.

In other exemplary embodiments, the procedure may be registered even from an unauthorized person. However, as in the present exemplary embodiment, by receiving the registration of the procedure by the authorized person, the registration of the procedure not intended by the authorized person is prevented.

The authority management unit 104 manages the information on the requested authority and the information on the authorized person given the authority. More specifically, for all the steps configuring the procedure to be registered, for each step, information on which authority is requested, and information on an authorized person for identifying the authorized person who has been given the requested authority are managed. For example, for a certain step, the information that the requested authority is the authority X and the information on the user ID and password of the user to whom the authority X is given are managed in association with each other.

In the present exemplary embodiment, it is assumed that there is an authorized person called "machine administrator" who has all the authorities managed by the authority management unit 104, in addition to the authorized persons who have been given respective authorities. That is, the machine administrator is an authorized person who has all the authorities requested in the system management function.

The notification creation unit 105 creates various notifications to be transmitted to other apparatuses. For example, in a case where the procedure management unit 103 receives a request to execute a procedure, the notification creation unit 105 creates a request notification requesting an authorized person to execute an operation for executing a step requiring an authority. The notification creation unit 105 according to the present exemplary embodiment is an example of a requiring unit that requests an authorized person to execute an operation for executing a step requiring an authority.

Further, for example, in a case where an operation by an authorized person is received by the operation reception unit 107 and the procedure is completed, a completion notification is created to the user who has requested the execution of the procedure.

The display control unit 106 controls the types and contents of images, various icons, texts, and the like displayed on the display unit 15, and controls display modes such as the position and size of the image and the like to be displayed.

For example, the display control unit 106 performs control to display a request screen 200 (described later with reference to FIG. 9) for receiving a procedure selection and execution request from the user. Further, for example, for the authorized person, control is performed to display an operation screen 300 (described later with reference to FIG. 12) that receives the operation for executing the step requiring the authority.

The operation reception unit 107 receives various operations input by the user via the input unit 14. The operation reception unit 107 receives, for example, an operation for executing an authority by an authorized person via an input unit 14 such as a touch panel or a key. In the present exemplary embodiment, in a state where the authorized person is authenticated by the user authentication unit 102, the operation performed on the operation screen 300 can be received as an operation for executing the authority.

The communication control unit 108 controls data communication by the communication unit 13. The communication control unit 108 performs control, for example, to transmit various notifications created by the notification creation unit 105 to other apparatuses. More specifically, the request notification created by the notification creation unit 105 is transmitted to the authorized person terminal 2 of the authorized person having the corresponding authority. Further, the completion notification created by the notification creation unit 105 is transmitted to the user terminal 3 of the user who has requested the execution of the procedure.

The setting change unit 109 executes the procedure according to the operation for executing each step by the authorized person. More specifically, the setting change unit 109 performs the process of changing setting items, in response to the execution of each step in the procedure.

Operation of Image Forming Apparatus 1

Next, the operation related to the setting change function of the image forming apparatus 1 will be described with reference to FIGS. 4 to 12.

First, the operation in a case where the management program is started in the image forming apparatus 1 will be described with reference to FIG. 4.

In the present exemplary embodiment, in a case where the image forming apparatus 1 is used, the user inputs his/her own user ID and password via the input unit 14 to perform authentication (login). Then, the management program is started by selecting the system management function from the list of functions displayed on the display unit 15.

Figure 4:
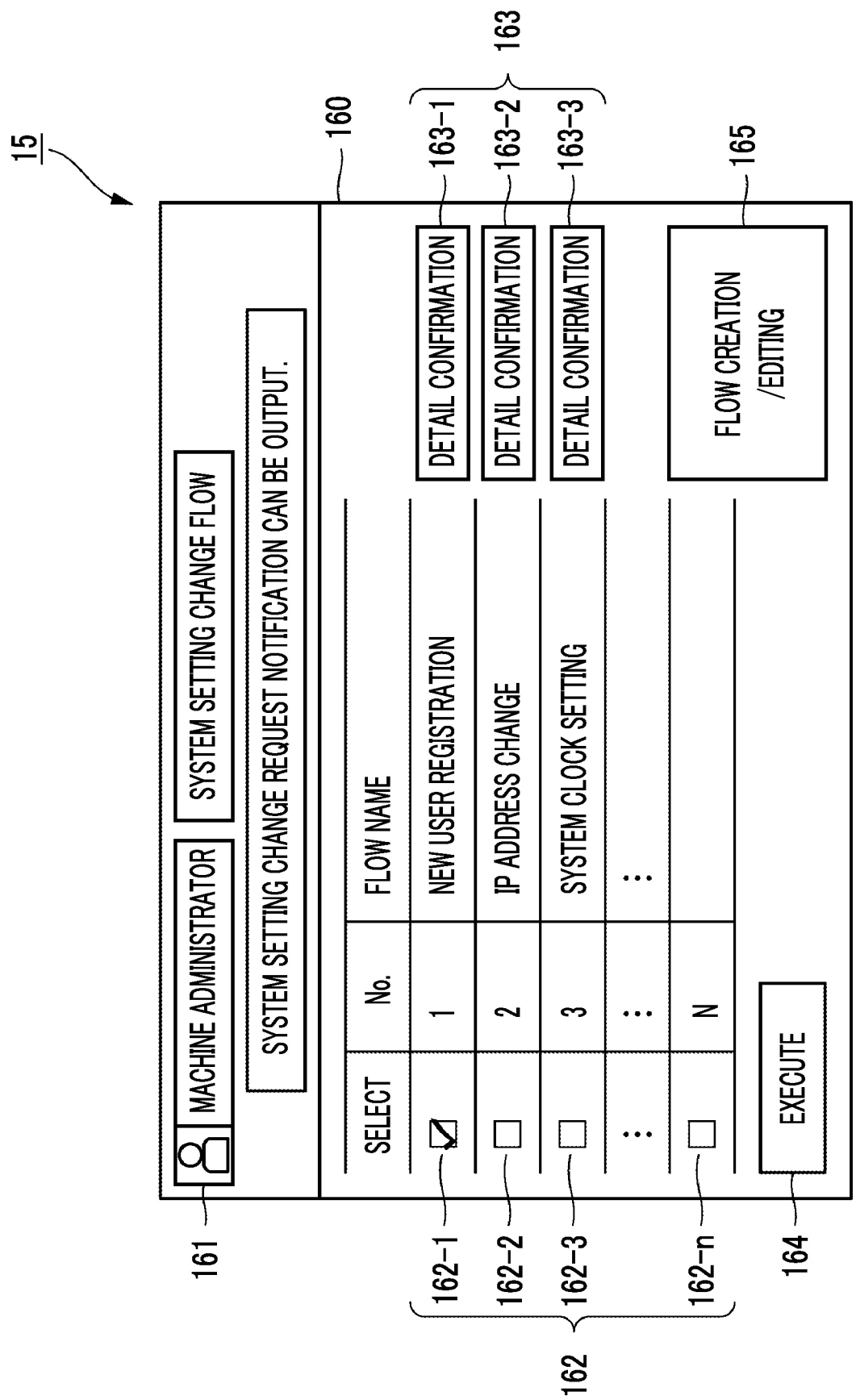
FIG. 4 is a diagram showing an example of a display screen in a case where a management program is started.

FIG. 4 is a diagram showing an example of a display screen 160 in a case where the management program is started. In the present exemplary embodiment, in a case where the management program is started, the common display screen 160 is displayed regardless of whether the user being authenticated is an authorized user or an unauthorized user. FIG. 4 shows a display example in a case where the machine administrator, who is one of the authorized persons, is authenticated as a user.

As shown, the display screen 160 includes a user display 161, a table 162, a "detail confirmation" button 163, an "execute" button 164, and a "flow creation/editing" button 165.

The user display 161 is a text, an image, or the like indicating information on an authenticated user. The user display 161 displays the name and user ID of the authenticated user, information on whether or not the user is authorized, and the like. In the present exemplary embodiment, on the user display 161, the name of the user is displayed in a case where the unauthorized person is authenticated, and information indicating an authorized person such as "authorized person" or "machine administrator" is displayed in a case where the authorized person is authenticated.

The table 162 displays a list of procedures registered and managed by the procedure management unit 103, and receives the selection of procedures. In the example of FIG.

4, three procedures Nos. 1 to 3 "new user registration (reference numeral 162-1)", "IP address change (reference numeral 162-2)", and "system clock setting (reference numeral 162-3)" are displayed as a list. The user can select a procedure by pressing the row of the procedure that the user wants to select, in the table 162. In FIG. 4, the procedure of "new user registration" is selected, and the "selection" is checked.

Further, in the example of FIG. 4, a row (reference numeral 162-*n*) for registering a new procedure is displayed in the table 162.

The "detail confirmation" button 163 is a button for instructing the display of a screen showing the details of the procedure. In the example of FIG. 4, the "detail confirmation" buttons 163-1, 163-2, and 163-3 respectively corresponding to "new user registration (reference numeral 162-1)", "IP address change (reference numeral 162-2)", and "system clock setting (reference numeral 162-3)" are displayed. The details of the screen showing the details of the procedure will be described later with reference to FIG. 10.

The "execute" button 164 is a button for instructing the display of the request screen 200 corresponding to the selected procedure.

The "flow creation/editing" button 165 is a button for instructing the display of the screen related to the registration of the procedure. As described above, in the present exemplary embodiment, registration of the procedure by an unauthorized person is not received. Therefore, in the state where the unauthorized person is authenticated, the "flow creation/editing" button 165 may be displayed in a hidden or grayed out state.

The details of the screen related to the registration of the procedure and the request screen 200 will be described later with reference to FIGS. 6 and 9.

Registration of Procedure

Next, the operation related to the registration of the procedure in the image forming apparatus 1 will be described with reference to FIGS. 3 and 4 and FIGS. 5 to 7. In addition, the "registration of procedure" includes editing and re-registering an existing procedure, and creating and registering a new procedure, but here, the case of editing and re-registering an existing procedure will be described as an example.

Figure 5:
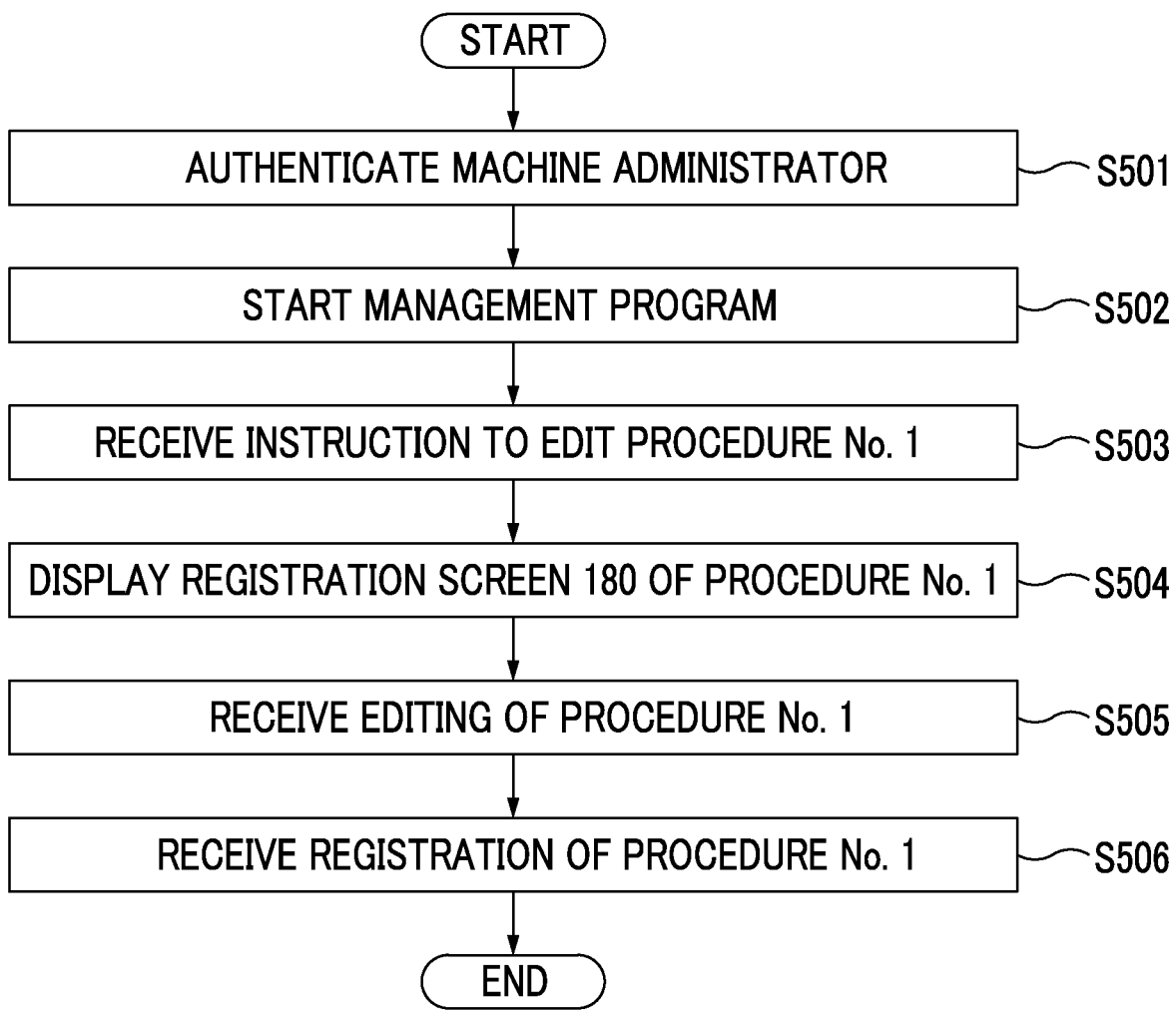
FIG. 5 is a flowchart showing an example of an operation related to registration of a procedure in the image forming apparatus.

FIG. 5 is a flowchart showing an example of an operation related to registration of a procedure in the image forming apparatus 1.

Figures 6A, 6B:
FIGS. 6A and 6B are views showing an example of a screen related to procedure registration.

FIGS. 6A and 6B are views showing an example of a screen related to procedure registration. FIG. 6A is a screen 170 displayed in a case where the "flow creation/editing" button 165 is pressed, and FIG. 6B is a registration screen 180 displayed in a case where the "edit/delete" button 172-1 is pressed.

Figure 7C:
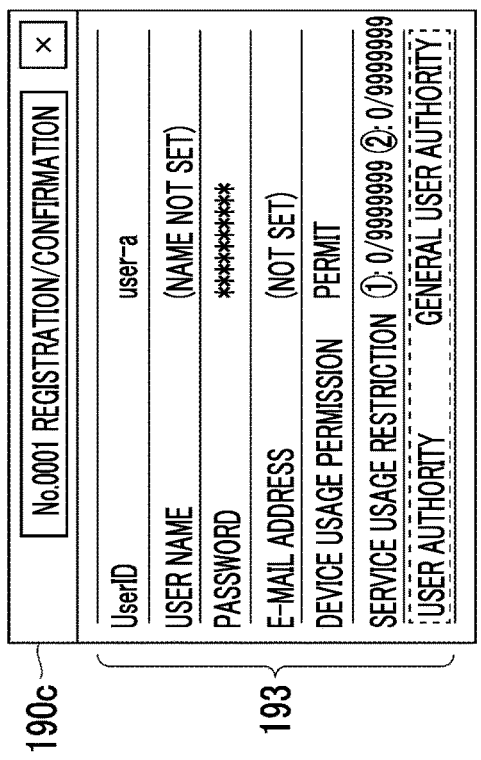
Figure 7D:
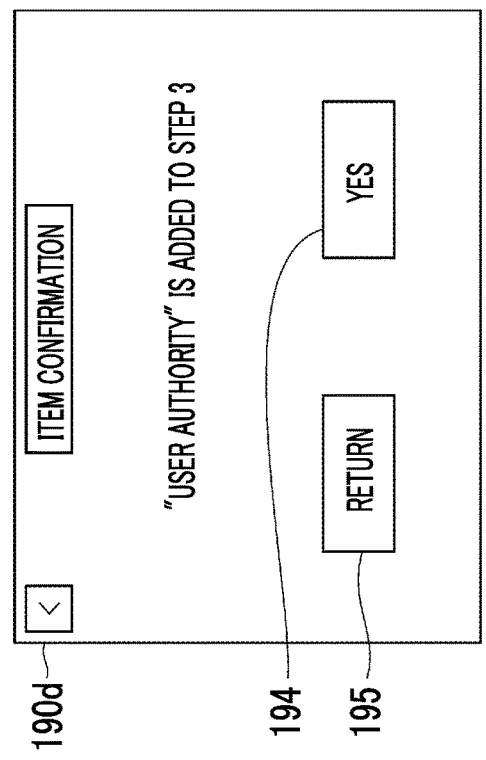
Figure 7A:
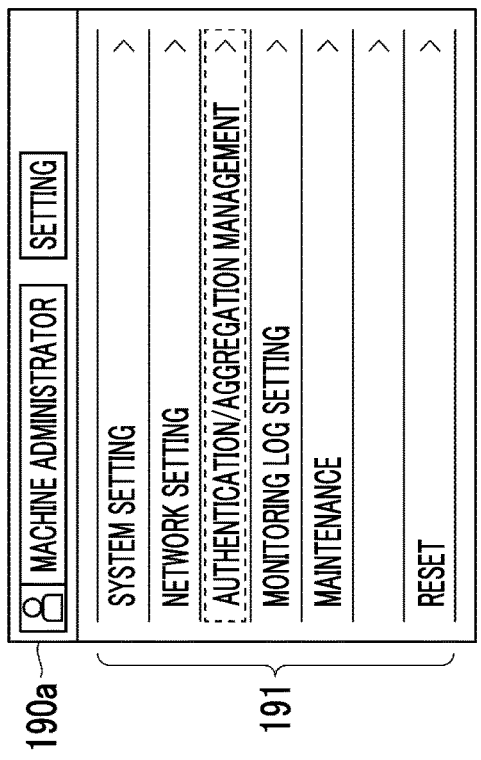
Figure 7B:
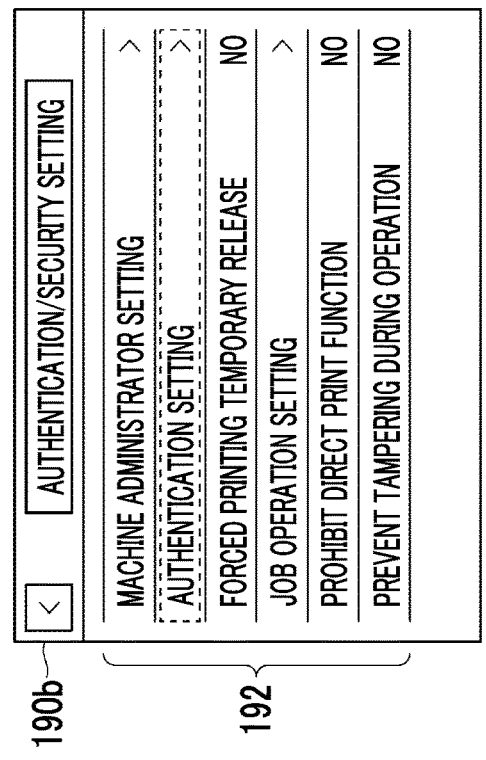

FIGS. 7A to 7D are diagrams showing an example of screen transitions in a case of adding a step to a procedure, in which FIG. 7A is a screen 190*a* including a list 191 of step groups classified according to the relationship between steps, FIG. 7B is a screen 190*b* including a list 192 of further finely classified step groups, FIG. 7C is a screen 190*c* including a list 193 of steps included in the selected step group, and FIG. 7D is a screen 190*d* asking whether or not to add the selected step.

First, as shown in FIG. 5, the user authentication unit 102 authenticates the authorized person (step S501). In this example, the machine administrator who is one of the authorized persons is authenticated.

Next, in response to the selection of the system management function, the management program is started (step S502). In the present exemplary embodiment, in a case where the management program is started, the display screen 160 is displayed.

Next, the procedure management unit 103 receives an instruction to edit the procedure (step S503).

In the present exemplary embodiment, in a case where the "flow creation/editing" button 165 is pressed on the display screen 160, the screen 170 shown in FIG. 6A is displayed. As shown, the screen 170 displays a table 171 that displays a list of existing procedures. In this example, "new user registration (reference numeral 171-1)", "IP address change (reference numeral 171-2)", and "system clock setting (reference numeral 171-3)" are displayed as existing procedures. Then, on the screen 170, "edit/delete" buttons 172 (172-1, 172-2, and 172-3) are displayed in association with respective procedures. The procedure management unit 103 receives an instruction to edit the corresponding procedure, in response to the pressing of any of the "edit/delete" buttons 172.

Here, the "edit/delete" button 172-1 corresponding to the procedure No. 1 "new user registration (reference numeral 171-1)" is pressed, it is assumed that the instruction to edit the procedure No. 1 has been received.

Returning to FIG. 5, the display control unit 106 controls the display unit 15 to display the registration screen 180 shown in FIG. 6B (step S504). Here, in a case where the procedure No. 1 in response to the reception of the editing instruction of the procedure No. 1 in step S503, the registration screen 180 for editing and registering the procedure No. 1 is displayed.

Then, the procedure management unit 103 receives the editing of the procedure No. 1 (step S505). More specifically, the addition or change of the step included in the procedure No. 1 is received via the registration screen 180.

Here, with reference to FIG. 6B and FIGS. 7A to 7D, the operation and the screen displayed on the display unit 15 in a case of editing the procedure will be described in detail.

As shown in FIG. 6B, the registration screen 180 according to the present exemplary embodiment includes an input field 181 for inputting the name of the procedure, an input field 182 for inputting the explanation of the procedure, a table 183 that displays a list of steps included in the procedure, and a "change" button 184 for instructing a change of each step included in the procedure.

As shown in Table 183, the steps of the procedure No. 1 include a step S1 "user registration/aggregation confirmation" and a step S2 "service usage restriction", and does not include step S3 and subsequent steps. In this procedure No. 1, in a case where the step S1 or the step S2 is changed, the "change" buttons 184-1, 2 associated with the steps S1 and S2 are pressed. In a case of adding a new step S3, the "change" button 184-3 associated with the step S3 is pressed.

In the present exemplary embodiment, regardless of whether the steps S1 and S2 are changed or the new steps S3 is added, a new step is selected according to the screen transitions of FIGS. 7A to 7D.

Here, an example of a case of adding the new step S3 is shown. First, on the screen 190*a*, a list 191 showing a list of step groups classified according to the relationship between the steps is displayed. In a case where any of the step groups is selected from the list 191, the screen transitions to a screen 190*b*, and a list 192 showing the step groups further finely classified is displayed. In a case where any of the step groups is selected from the list 192, the screen transitions to a screen 190*c*, and a list 193 showing the steps included in the selected step group is displayed. Then, in a case where a step to be added is selected from the list 193, a screen 190*d* asking whether or not to add the selected step is displayed. In the example of FIGS. 7A to 7D, in a case where the "Yes" button 194 on the screen 190*d* is pressed, it is instructed to add the selected step, the selected step is added as the step 3, and the screen returns to the registration screen 180. Further, in a case where the "return" button 195 on the screen 190*d* is pressed, it is instructed to cancel the addition of the selected step, and the screen returns to the registration screen 180 without adding the selected step.

In the example shown in FIGS. 7A to 7D, a "authentication/aggregation management" step group is selected on the screen 190*a* on which the list 191 is displayed (FIG. 7A). Then, on the transition screen 190*b*, an "authentication setting" step group is selected (FIG. 7B). Further, in the transition screen 190*c*, the "user authority" step is selected (FIG. 7C). As a result, it is asked whether or not to add the "user authority" step on the transition screen 190*d*. In FIGS. 7A to 7C, the selected step group or step is indicated by a broken line.

Returning to FIG. 5, the procedure management unit 103 receives the registration of the procedure No. 1 after editing (step S506). In the present exemplary embodiment, in a case where the "editing complete" button 186 is pressed on the registration screen 180, the registration of the procedure No. 1 is received.

Here, in step S505, it is assumed that the procedure No. 1 is registered by pressing the "editing complete" button 186 in a state where the procedure No. 1 includes only the step S1 "user registration/aggregation confirmation" and the step S2 "service usage restriction", without changing the steps S1 and S2 and adding the step S3.

Although the operation in a case of editing and re-registering the existing procedure No. 1 has been described above, the same operation as in steps 501 to 506 is performed in a case of registering a new procedure. More specifically, in a case where the "new creation" button 173 (see FIG. 6A) is pressed, an instruction to create a new procedure is received, the corresponding registration screen 180 is displayed, and the creation and registration of the new procedure are received on the new registration screen 180. Then, the new procedure created is added to the row 171-*n* in the table 171 (see FIG. 6A).

The registration screen 180 described above is an example, and is not limited to the example of FIG. 6B, as long as the procedure registration is received after the step designation (selection) is selected. Further, the screen transitions in FIGS. 7A to 7D are an example, and are not particularly limited, as long as the steps to be added (or changed) can be designated (selected).

Here, "user registration/aggregation confirmation" is a step of inputting information such as the name, user ID, and password of the user to be registered as a new user and putting the user under the control of the user management unit 101, which requests the authority A1 possessed by a predetermined authorized person SA-1. Further, "service usage restriction" is a step of restricting the usage of a user to be registered as a new user, with respect to various functions provided by the computer system 1000, which requests the authority A2 possessed by a predetermined authorized person SA-2.

The "user registration/aggregation confirmation" and "service usage restriction" are examples of steps requiring authorities. The procedure No. 1 is registered as a procedure including a first step S1 requiring the authority A1 of the first authorized person SA-1 and a second step S2 requiring the authority A2 of the second authorized person SA-2.

Further, the procedure management unit 103 in the present exemplary embodiment receives registration of a procedure requiring a plurality of authorities, from an authorized person having all the plurality of authorities. In the above example, the machine administrator has both the authorities A1 and A2, so that the registration of the procedure No. 1 requiring the authorities A1 and A2 is received. On the contrary, from the authorized persons SA-1 and SA-2 who have only one of the authorities A1 and A2, the registration of the procedure No. 1 is not received. Thus, even in a case where a plurality of authorities are required, registration of a procedure not intended by each authorized person is prevented.

Reception of Request

Next, the operation related to the request for execution of the procedure in the image forming apparatus 1 will be described with reference to FIGS. 8 to 10. Here, the case of requesting the execution of the procedure No. 1 "new user registration" registered in steps 501 to 506 (see FIG. 5) will be described as an example. The user who requests the execution of the procedure may be an authorized person or an unauthorized person. Here, it is assumed that the user B (User-B) requests the execution of the procedure.

Figure 8:
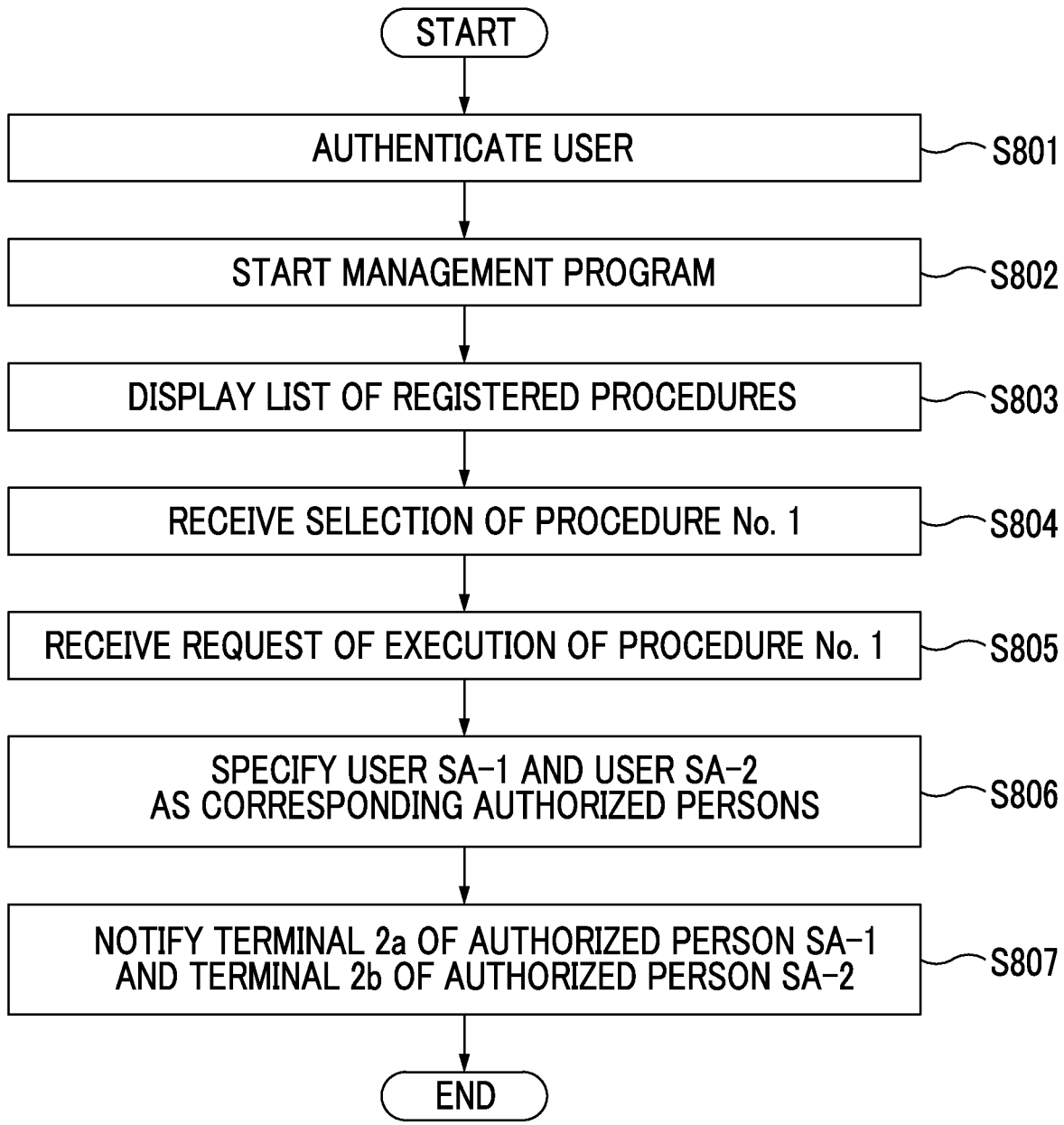
FIG. 8 is a flowchart showing an example of an operation related to a request for execution of a procedure in the image forming apparatus.

FIG. 8 is a flowchart showing an example of an operation related to a request for execution of a procedure in the image forming apparatus 1.

Figure 9A:
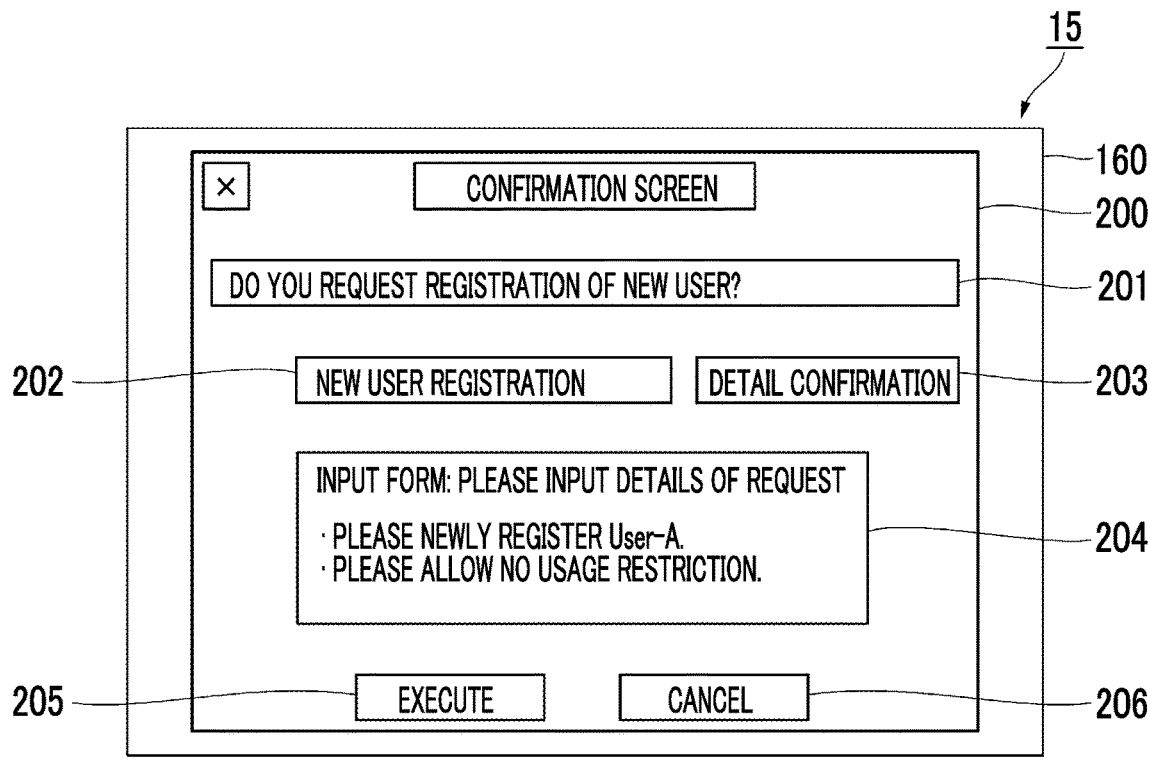
Figure 9B:
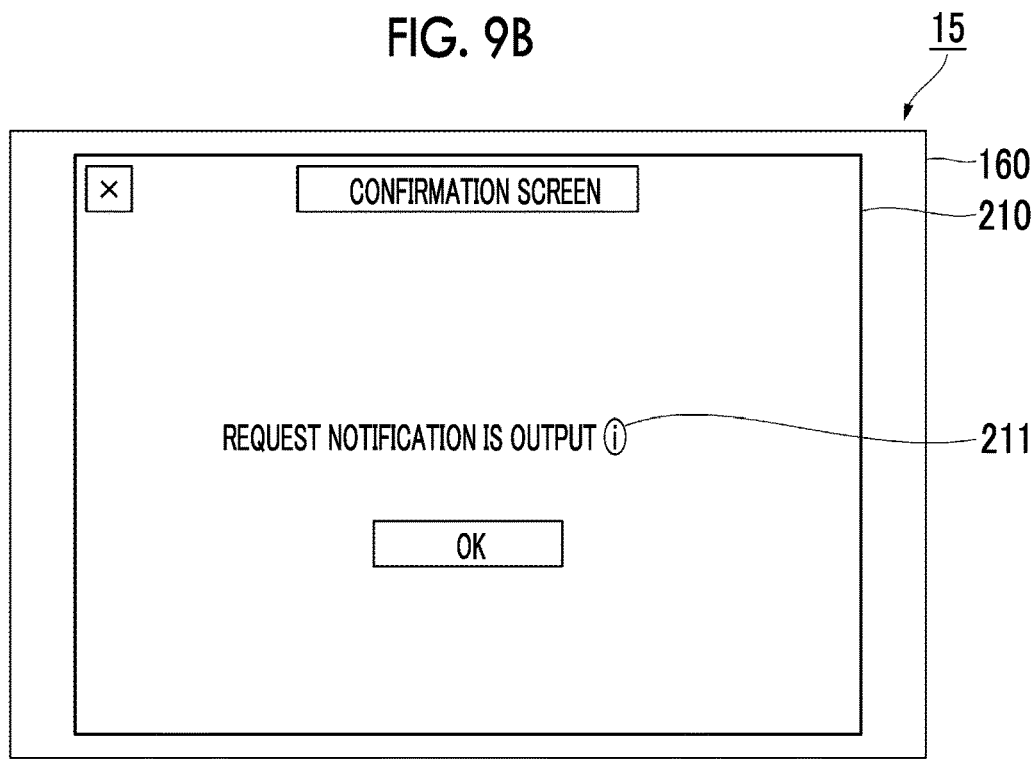

FIGS. 9A and 9B are diagrams showing an example of a screen relating to a request, in which FIG. 9A is the request screen 200 for receiving a request for execution of the procedure No. 1, and FIG. 9B is a screen 210 including information indicating that a request notification has been transmitted.

Figure 10:
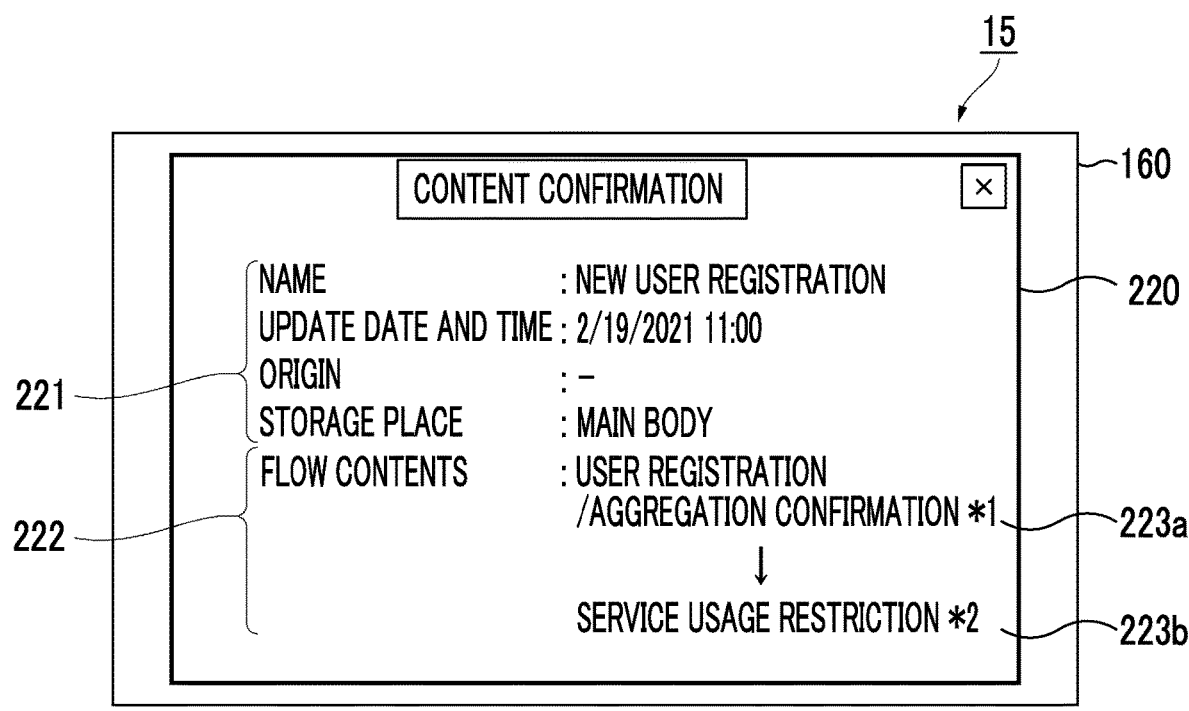
FIG. 10 is a diagram showing an example of a screen presenting details of the procedure.

FIG. 10 is a diagram showing an example of a screen 220 presenting details of the procedure.

First, as shown in FIG. 8, the user authentication unit 102 authenticates a person who uses the host apparatus as the user of the computer system 1000 (step S801).

Next, in response to the selection of the system management function, the management program is started (step S802), and the registered procedures are displayed as a list (step S803). As described above, in the present exemplary embodiment, in a case where the management program is started, a display screen 160 (see FIG. 4) including the table 162, which is a list of procedures, is displayed.

Then, the procedure management unit 103 receives the selection of the procedure No. 1 requesting the execution (step S804). In the present exemplary embodiment, in a case where on the display screen 160 shown in FIG. 4, the procedure No. 1 (reference numeral 162-1) of the table 162 is pressed and then the "execute" button 164 is pressed, a fact that the procedure No. 1 is selected as a procedure for requesting execution is received. Then, on the display unit 15, the request screen 200 for receiving a request for execution of the procedure No. 1 is displayed.

Here, as shown in FIG. 9A, the request screen 200 includes a procedure description (reference numeral 201) input by the registrant in a case of registering the procedure, a procedure name (reference numeral 202), a "detail confirmation" button 203 for instructing the display of the screen 220 showing the details of the procedure, an input field 204 for receiving the input of the details of the request by the user, an "execution" button 205 for receiving an instruction to request the execution of the procedure, and a "cancel" button 206 for receiving an instruction to cancel the input of the request.

Returning to FIG. 8, the procedure management unit 103 receives the request for execution of the selected procedure No. 1 (step S805). In the present exemplary embodiment, the procedure management unit 103 receives the request for execution of the selected procedure No. 1, in response to the pressing of the "execute" button 205 on the request screen 200.

In a case where the request for execution of the procedure No. 1 is received, the authority management unit 104 specifies the user SA-1 and the user SA-2 as users having the corresponding authority, that is, an authorized person (step S806). More specifically, the authority management unit 104 knows that the authority A1 is requested and that the authority A1 is given to the user SA-1, with reference to the information regarding "user registration/aggregation confirmation" registered as the step S1 in the procedure No. 1, and specifies the user SA-1 as the authorized person SA-1 corresponding to the step S1. Similarly, the authority management unit 104 knows that the authority A2 is requested and that the authority A2 is given to the user SA-2, with reference to the information regarding "service usage restriction" registered as the step S2, and specifies the user SA-2 as the authorized person SA-2 corresponding to the step S2.

Next, the image forming apparatus 1 transmits a request notification requesting an operation for executing the steps S1 and S2, to the authorized person terminal 2a of the authorized person SA-1 and the authorized person terminal 2b of the authorized person SA-2 (step S807). As described above, the request notification is created by the notification creation unit 105, and transmitted by the communication control unit 108.

As long as each authorized person can know that the operation for executing a step is requested, the content of the request notification is not limited, and may be, for example, a text such as "'user registration/aggregation confirmation' is requested." Further, the request notification may include information such as details of the request input by the user in the input field 204 of the request screen 200.

Further, in the present exemplary embodiment, in a case where the request notification is transmitted to the authorized person, the screen 210 shown in FIG. 9B is displayed. Information such as text indicating that the request notification has been transmitted is displayed on the screen 210, and the user can know that the request to the authorized person has been made. It should be noted that on the screen 210, a button 211 for instructing the display of the screen showing the details of the procedure requested to be executed, or the like may be displayed.

Here, in the present exemplary embodiment, in a case where the "detail confirmation" button 203 is pressed on the request screen 200, a screen 220 showing the details of the selected procedure No. 1 is displayed. As shown in FIG. 10, on the screen 220, information (reference numeral 222) indicating that the procedure No. 1 is configured with the step S1, "user registration/aggregation confirmation" and the step S2 "service usage restriction" is presented. Further, marks 223a and 223b are given as information indicating that the steps S1 and S2 are steps requiring authorities. Here, different marks 223a and 223b are used in response to the fact that the step S1 and the step S2 are steps requiring different authorities. The procedure may include not only a step requiring an authority but also a step not requiring authority, but by giving the marks 223a and 223b, the user can know the step requiring an authority. The marks 223a and 223b are examples of information indicating which step is a step requiring an authority.

As described above, on the screen 220, information on the steps configuring the selected procedure and information indicating which step requires authority are presented, but information for identifying the authorized person corresponding to each step is not presented. For example, the names of authorized persons SA-1 and SA-2, user IDs, and the like are not presented. Furthermore, in the present exemplary embodiment, the image forming apparatus 1 does not present any information for identifying the authorized person to the user. Thus, it is possible to prevent the authorized person from being specified by the user, and improve the security of the computer system 1000.

In addition, on the screen 220, the name of the selected procedure, information on the date and time of a case where the procedure is registered, and the like may be displayed (reference numeral 221).

The same screen 220 may be displayed even in a case where the "detail confirmation" button 163 on the display screen 160 (see FIG. 4) or the button 211 on the screen 210 (see FIG. 9B) is pressed. The operations of pressing the "detail confirmation" button 163, the "detail confirmation" button 203, and the button 211 are examples of predetermined operations by the user, respectively.

Execution of Procedure

Next, the operation related to the execution of the procedure in the image forming apparatus 1 will be described with reference to FIG. 11. Here, the case of executing the procedure No. 1 "new user registration" requested in steps 801 to 807 (see FIG. 8) will be described as an example.

Figure 11:
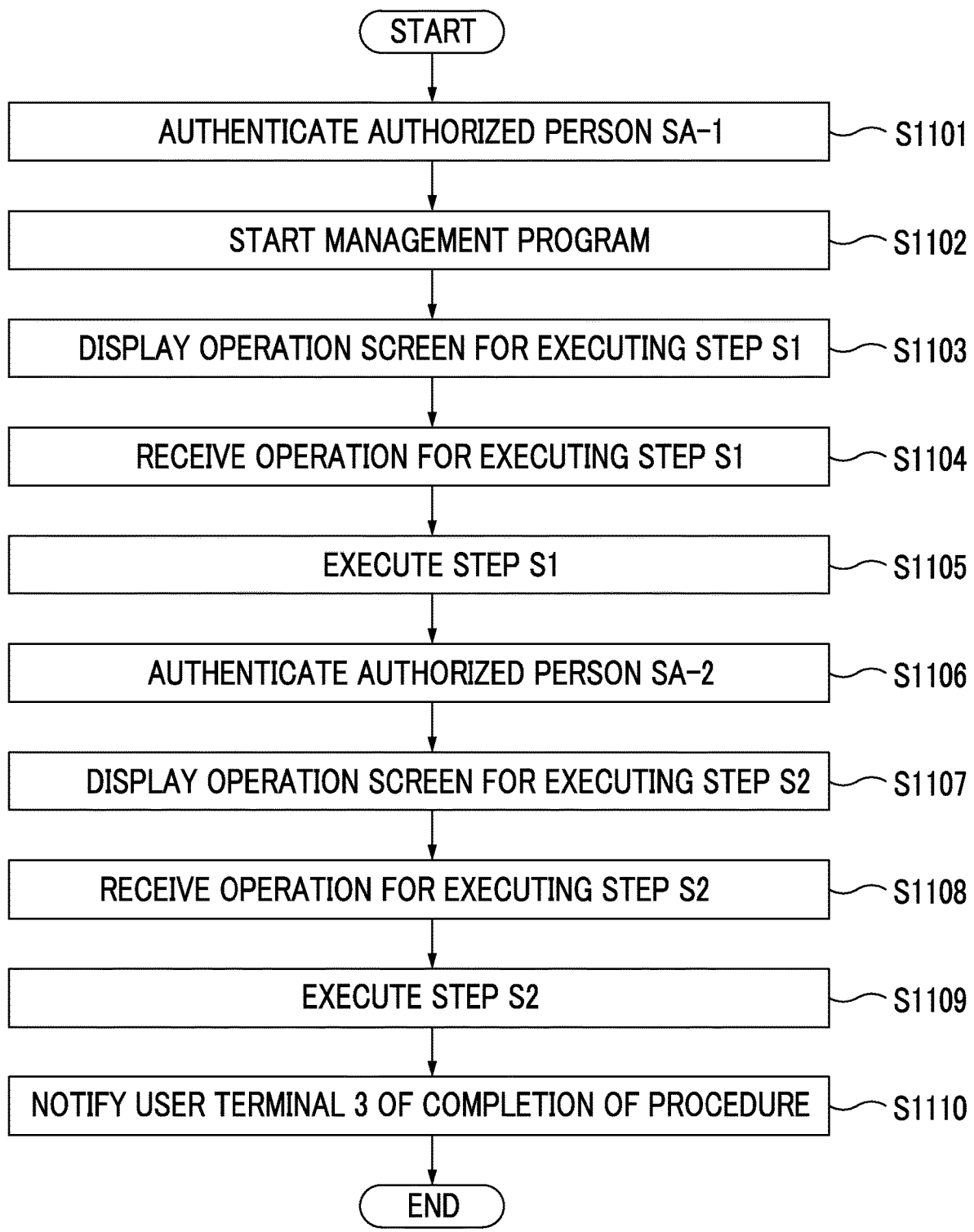
FIG. 11 is a flowchart showing an example of an operation related to execution of a procedure in the image forming apparatus.

FIG. 11 is a flowchart showing an example of an operation related to execution of a procedure in the image forming apparatus 1.

First, as shown in FIG. 11, the authorized person SA-1 corresponding to the step S1 is authenticated (step S1101), and the management program is started (step S1102).

Then, the display control unit 106 displays the operation screen 300 that receives the operation for executing the step S1, in response to the authentication of the authorized person SA-1 (step S1103). The details of the operation screen 300 will be described later.

Next, the operation reception unit 107 receives an operation for executing the step S1 by the authorized person SA-1 (step S1104). In the present exemplary embodiment, an operation for executing the step S1, performed via the operation screen 300, is received.

Then, in response to the reception of the operation for executing the step S1, the setting change unit 109 executes the step S1 (step S1105). Here, as step S1, "user registration/aggregation confirmation" is executed.

Similarly, the authorized person SA-2 corresponding to the step S2 is authenticated (step S1106), and the management program is started. Then, in response to the authentication of the authorized person SA-2, the operation screen 300 for receiving the operation for executing the step S2 is displayed (step S1107), and the operation for executing the step S2 is received (step S1108).

Here, in the present exemplary embodiment, the steps S1, S2, S3, . . . included in the procedure are registered as to be executed in numerical order. That is, it is restricted that the steps S1, S2, S3, . . . need to be performed in this order. In the procedure No. 1, it is restricted that after the step S1 "user registration/aggregation confirmation" is performed, the step S2 "service usage restriction" is performed. Therefore, the operation reception unit 107 according to the present exemplary embodiment receives an operation for executing the step S2 by the authorized person SA-2, after the step S1 is executed. In this way, by receiving the operation for executing the post-step (S2) after the pre-step (S1) is executed, the procedure is smoothly performed even in a case where the order of executing each step is restricted, as compared with the case of receiving the operation for executing the post-step (S2) regardless of whether or not the pre-step (S1) is executed.

The authority management unit 104 may manage the priority order for each step, and the order in which the steps are executed may be restricted according to the priority order.

In response to the reception of the operation for executing the step S2, the setting change unit 109 executes the step S2 (step S1109). Here, as step S2, "service usage restriction" is executed.

Then, in response to the execution of all the steps (S1 and S2) included in the procedure No. 1, the user terminal 3 is notified of the completion of the procedure (step S1110). More specifically, the completion notification created by the notification creation unit 105 is transmitted by the communication control unit 108 to the user terminal 3 of the user B (User-B) who has requested the execution of the procedure.

Further, the process of "new user registration" is completed, in response to the completion of this procedure.

Here, the details of the operation screen 300 will be described with reference to FIG. 12. Here, the operation screen 300 for executing the step S2 "service usage restriction" will be described as an example.

Figure 12:
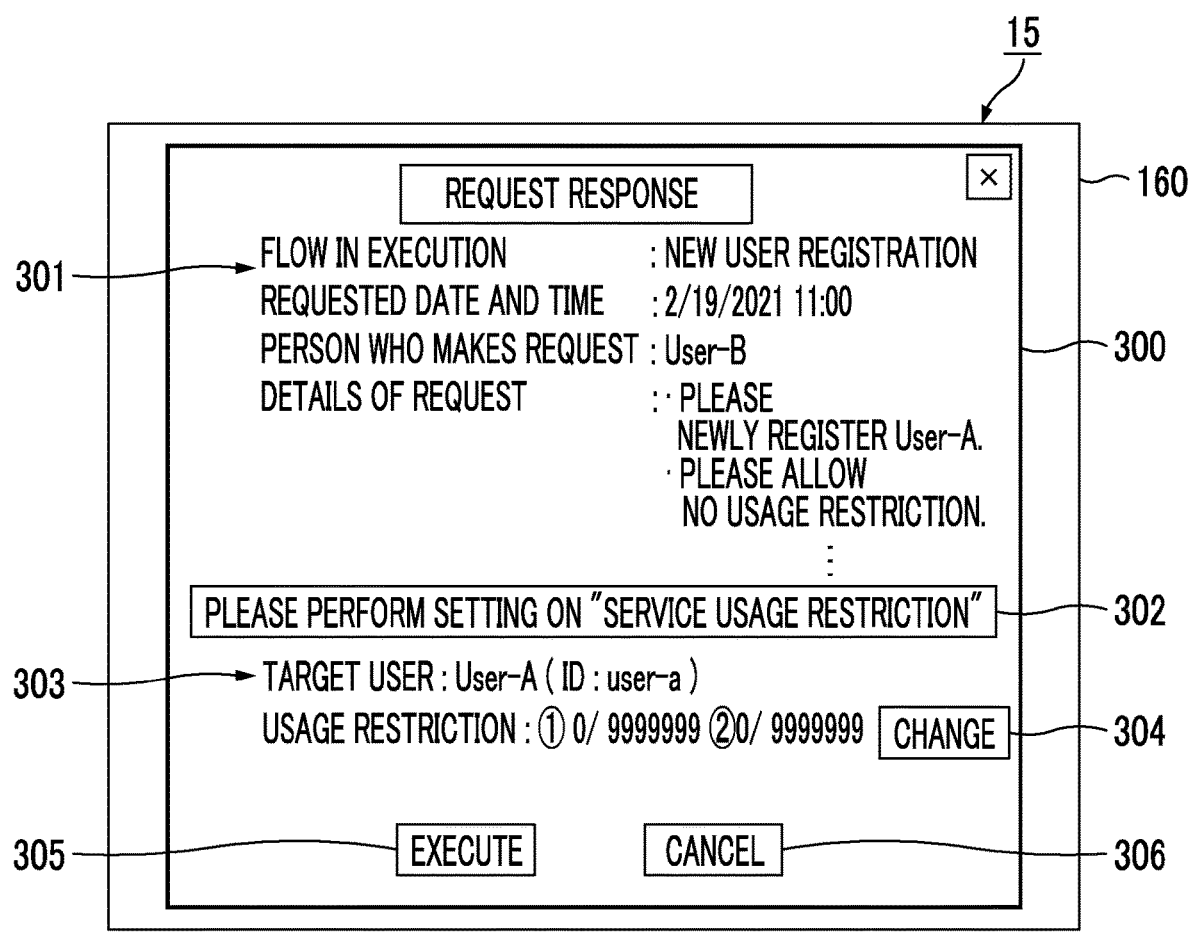
FIG. 12 is a diagram showing an example of an operation screen.

FIG. 12 is a diagram showing an example of the operation screen 300.

As shown in FIG. 12, on the operation screen 300, a text 301 such as the name of the procedure No. 1 requested to be executed, the requested date and time, the name of the user B (User-B) that made a request, and the details of the request that has been input at the time of the request, and a text 302 requesting the authorized person SA-2 to perform an operation using the operation screen 300 are displayed.

Further, on the operation screen 300, a text 303 indicating the information on the user A (User-A) who is the target of the "service usage restriction" and the content of the usage restriction to be set is displayed. The authorized person SA-2 checks the texts 301, 302, 303, and in a case where there is no problem in the contents, the authorized person SA-2 presses the "execute" button 305 to execute the procedure. Pressing the "execute" button 305 is an example of an operation for executing a step requiring an authority.

Further, a "change" button 304 for changing the content of the set usage restriction, a "cancel" button 306 for rejecting or suspending the execution of the step S2, and the like may be displayed.

The operation screen 300 may be any as long as the operation screen 300 receives an operation for executing a step requiring an authority, and the displayed contents are not limited to the example of FIG. 12.

In the present exemplary embodiment, the display of the operation screen 300 according to the authentication of the authorized persons SA-1 and SA-2 is performed on the condition that the authorized persons SA-1 and SA-2 have received the request notification. That is, after the operation for executing the step is requested, the operation screen 300 is displayed, in response to the authentication of each authorized person.

Modification Example or the Like

As described above, in the present exemplary embodiment, the request notification is sent to the authorized persons SA-1 and SA-2 at the same time, the step S1 is executed, and then the operation for executing the step S2 is received, thereby performing the step S2 after the step S1. Instead of this, a request notification may be given to the authorized person SA-2, after the step S1 is executed. With such a configuration, the procedure can be smoothly performed, even in a case where the order in which each step is executed is restricted, as compared with the case where the pre-step (S1) and the post-step (S2) are requested at the same time.

Further, in the present exemplary embodiment, with respect to a procedure requiring a plurality of authorities, registration of the procedure is received from an authorized person having all the requested authorities. Instead of this, in a case where the registration of a procedure requiring a plurality of authorities is requested, each authorized person is inquired about allowing the registration of the procedure, and in a case where the registration of a procedure is allowed, the registration may be received. For example, in a case where the registration of the procedure No. 1 including the step S1 requiring the authority A1 and the step S2 requiring the authority A2 is requested, the authorized person terminals 2a and 2b of the authorized persons SA-1 and SA-2 are inquired about allowing the registration, and in a case where the authorized persons SA-1 and SA-2 allow the registration, the registration of the procedure No. 1 may be received. With such a configuration, even in a case where the registration of the procedure is allowed by the unauthorized person or the authorized person having only some authorities, the registration of the procedure not intended by the authorized person is prohibited.

Further, an example in which the operation screen 300 is displayed on the display unit 15 of the image forming apparatus 1, and an operation for executing the step is received has been described, but the same operation screen 300 may be displayed on the display unit of the authorized person terminal 2, and the operation by the authorized person may be received. In this case, the operation reception unit 107 of the image forming apparatus 1 may acquire the operation information indicating that the operation for executing the step requiring the authority has been performed from the authorized person terminal 2, and execute the step, based on the operation information.

Furthermore, in the present exemplary embodiment, the example of the computer system 1000 including the image forming apparatus 1 has been described, but the configuration of the computer system is not limited, and the computer system may be configured without including the image forming apparatus. Further, although an example of the case of performing the process of changing setting items has been described, the content of a process requiring authority is not limited, and for example, a process such as moving or duplicating a highly confidential file may be targeted.

Although the exemplary embodiments of the present invention have been described above, the technical scope of the present invention is not limited to the scope described as the above exemplary embodiment and modification examples. It is clear from the description of the claims that a combination of a plurality of modification examples and various modifications or improvements to the above exemplary embodiment are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive registration of a procedure of a process in a computer system, the procedure including a step requiring an authority of a predetermined authorized person;
receive a request to execute the procedure from a user of the computer system;
request the authorized person to execute an operation for executing the step requiring the authority, in response to the reception of the request;
receive the operation by the authorized person to execute the procedure including the step requiring the authority;
receive the registration of the procedure including a first step requiring an authority of a first authorized person and a second step requiring an authority of a second authorized person different from the first authorized person, as the step requiring the authority;
request the first authorized person to execute an operation for executing the first step; and
request the second authorized person to execute an operation for executing the second step.

2. The information processing apparatus according to claim 1, wherein the processor is configured to:
request the second authorized person to execute an operation for executing the second step, after the first step is executed, in a case where the second step needs to be performed after the first step.

3. The information processing apparatus according to claim 1, wherein the processor is configured to:
receive an operation for executing the second step by the second authorized person, after the first step is executed, in a case where the second step needs to be performed after the first step.

4. The information processing apparatus according to claim 1, wherein the processor is configured to:
in a case where the registration of the procedure including the first step and the second step is requested, inquire the first authorized person and the second authorized person about allowing the registration of the procedure, and
receive the registration of the procedure, in a case where the registration of the procedure is allowed by the first authorized person and the second authorized person.

5. The information processing apparatus according to claim 1, wherein the processor is configured to:
present, to the user, information on steps configuring the procedure and information indicating which step in the procedure requires an authority, in a case where a predetermined operation is performed by the user.

6. The information processing apparatus according to claim 5, wherein the processor is configured to:
not present information for identifying the authorized person to the user.

7. The information processing apparatus according to claim 1, wherein the processor is configured to:
display an operation screen for receiving the operation for executing the step requiring the authority by the authorized person.

8. The information processing apparatus according to claim 7, wherein the processor is configured to:
receive an input of information for authenticating the authorized person, and
display the operation screen, in a case where the authorized person is authenticated, after requesting the authorized person to execute the operation for executing the step requiring the authority.

9. The information processing apparatus according to claim 1, wherein the processor is configured to:
acquire, from another apparatus used by the authorized person, operation information indicating that the operation for executing the step requiring the authority is performed in the other apparatus, and
execute the procedure including the step requiring the authority, based on the operation information.

10. The information processing apparatus according to claim 1, wherein the processor is configured to:
receive the registration of the procedure requiring a plurality of authorities, from an authorized person having all the plurality of authorities.

11. An information processing apparatus comprising:
a processor configured to:
display a request screen for receiving a request for execution of a procedure of a process in a computer system from a user of the computer system, the procedure including a step requiring an authority of a predetermined authorized person;
display an operation screen for receiving an operation for executing a step requiring the authority, in a case where information for authenticating the authorized person is input, after receiving the request from the user;
display registration screens for receiving the registration of the procedure including a first step requiring an authority of a first authorized person and a second step requiring an authority of a second authorized person different from the first authorized person, as the step requiring the authority; and
configure a first screen to be displayed for requesting the first authorized person to execute an operation for executing the first step and configure a second screen to be displayed for requesting the second authorized person to execute an operation for executing the second step.

12. An information processing system comprising:
a registration unit that receives registration of a procedure of a process in a computer system, the procedure including a step requiring an authority of a predetermined authorized person;
a request unit that receives a request for execution of the procedure registered by the registration unit, from a user of the computer system;
a requiring unit that requests the authorized person to execute an operation for executing the step requiring the authority, in response to the reception of the request by the request unit;
an execution unit that receives the operation by the authorized person to execute the procedure including the step requiring the authority;
an authority management unit that receives the registration of the procedure including a first step requiring an authority of a first authorized person and a second step requiring an authority of a second authorized person different from the first authorized person, as the step requiring the authority, and a notification generation unit that creates a first request notification that requests the first authorized person to execute an operation for executing the first step and a second request notification that requests the second authorized person to execute an operation for executing the second step.

13. A non-transitory computer readable medium storing a program implementing:
- a function of receiving registration of a procedure of a process in a computer system, the procedure including a step requiring an authority of a predetermined authorized person;
- a function of receiving a request to execute the procedure from a user of the computer system;
- a function of requesting the authorized person to execute an operation for executing the step requiring the authority, in response to the reception of the request;
- a function of receiving the operation by the authorized person to execute the procedure including the step requiring the authority;
- a function of receiving the registration of the procedure including a first step requiring an authority of a first authorized person and a second step requiring an authority of a second authorized person different from the first authorized person, as the step requiring the authority;
- a function of creating a first request notification that requests the first authorized person to execute an operation for executing the first step; and
- a function of creating a second request notification that requests the second authorized person to execute an operation for executing the second step.

* * * * *